(12) United States Patent
Surtani et al.

(10) Patent No.: US 8,719,307 B2
(45) Date of Patent: May 6, 2014

(54) CONCURRENT LINKED HASHED MAPS

(75) Inventors: Manik Surtani, London (GB); Jason Greene, Madison, WI (US)

(73) Assignee: Red Hat, Inc., Raleigh, NC (US)

( * ) Notice: Subject to any disclaimer, the term of this patent is extended or adjusted under 35 U.S.C. 154(b) by 417 days.

(21) Appl. No.: 12/766,647

(22) Filed: Apr. 23, 2010

(65) Prior Publication Data

US 2011/0264687 A1    Oct. 27, 2011

(51) Int. Cl.
    *G06F 7/00* (2006.01)
(52) U.S. Cl.
    USPC .......................................... 707/800; 707/693
(58) Field of Classification Search
    USPC .................... 707/800, 693, 999.101
    See application file for complete search history.

(56) References Cited

U.S. PATENT DOCUMENTS

| | | | | |
|---|---|---|---|---|
| 4,584,639 A * | 4/1986 | Hardy | | 726/2 |
| 5,765,165 A * | 6/1998 | Harper | | 1/1 |
| 5,832,484 A * | 11/1998 | Sankaran et al. | | 1/1 |
| 6,226,639 B1 * | 5/2001 | Lindsay et al. | | 1/1 |
| 6,247,108 B1 * | 6/2001 | Long | | 711/216 |
| 6,263,331 B1 * | 7/2001 | Liu et al. | | 1/1 |
| 6,321,232 B1 * | 11/2001 | Syeda-Mahmood | | 1/1 |
| 6,578,131 B1 * | 6/2003 | Larson et al. | | 711/216 |
| 6,601,120 B1 * | 7/2003 | Schimmel | | 710/107 |
| 6,748,401 B2 * | 6/2004 | Blackburn et al. | | 1/1 |
| 7,287,131 B1 * | 10/2007 | Martin et al. | | 711/154 |
| 7,346,059 B1 * | 3/2008 | Garner et al. | | 709/242 |
| 7,360,043 B1 * | 4/2008 | Bonebakker | | 711/160 |
| 7,370,054 B1 * | 5/2008 | Martin et al. | | 707/747 |
| 7,469,241 B2 * | 12/2008 | Bellamkonda et al. | | 1/1 |
| 7,516,151 B2 * | 4/2009 | Norton et al. | | 1/1 |
| 7,533,138 B1 * | 5/2009 | Martin | | 1/1 |
| 7,702,628 B1 * | 4/2010 | Luchangco et al. | | 707/999.006 |
| 7,729,385 B2 * | 6/2010 | Muller et al. | | 370/486 |
| 7,818,531 B2 * | 10/2010 | Barrall | | 711/170 |
| 7,873,782 B2 * | 1/2011 | Terry et al. | | 711/114 |
| 7,950,062 B1 * | 5/2011 | Ren et al. | | 726/26 |
| 7,962,707 B2 * | 6/2011 | Kaakani et al. | | 711/159 |
| 8,126,927 B1 * | 2/2012 | Binshtock et al. | | 707/800 |
| 8,321,434 B1 * | 11/2012 | Ren et al. | | 707/755 |
| 2003/0009482 A1 * | 1/2003 | Benerjee et al. | | 707/200 |
| 2003/0074341 A1 * | 4/2003 | Blackburn et al. | | 707/1 |
| 2004/0044861 A1 * | 3/2004 | Cavallo et al. | | 711/160 |
| 2004/0059734 A1 * | 3/2004 | Smith et al. | | 707/9 |
| 2004/0073707 A1 * | 4/2004 | Dillon | | 709/245 |
| 2005/0071335 A1 * | 3/2005 | Kadatch | | 707/8 |
| 2005/0171937 A1 * | 8/2005 | Hughes et al. | | 707/3 |
| 2006/0092867 A1 * | 5/2006 | Muller et al. | | 370/312 |
| 2006/0116989 A1 * | 6/2006 | Bellamkonda et al. | | 707/3 |

(Continued)

OTHER PUBLICATIONS

Sundell et al., "Lock-Free Deques and Doubly Linked Lists", J. Parallel Distrib. Comput. 68 (2008), pp. 1008-1020. (Provided by Applicant).*

(Continued)

*Primary Examiner* — Phuong Thao Cao
(74) *Attorney, Agent, or Firm* — Lowenstein Sandler LLP

(57) ABSTRACT

An apparatus and a method for forming a concurrent linked hash map is described. Doubly linked nodes of a linked list are formed in a data container of a networked memory. A hash table is generated from the doubly linked nodes. A parent node is located in the hash table to update a reference of a node in the data container. The parent node is processed in a forward direction of the linked list.

20 Claims, 7 Drawing Sheets

(56) References Cited

U.S. PATENT DOCUMENTS

| | | | |
|---|---|---|---|
| 2007/0157200 A1* | 7/2007 | Hopkins | 718/100 |
| 2007/0157214 A1* | 7/2007 | Martin et al. | 719/315 |
| 2008/0192754 A1* | 8/2008 | Ku et al. | 370/395.32 |
| 2008/0222401 A1* | 9/2008 | Dewey et al. | 712/228 |
| 2008/0263316 A1* | 10/2008 | Ross | 711/216 |
| 2009/0180489 A1* | 7/2009 | Fujita et al. | 370/409 |
| 2009/0228514 A1* | 9/2009 | Liu et al. | 707/102 |
| 2010/0185703 A1* | 7/2010 | Ylonen | 707/816 |
| 2010/0257181 A1* | 10/2010 | Zhou et al. | 707/747 |
| 2011/0219222 A1* | 9/2011 | Eichenberger et al. | 712/241 |
| 2011/0246503 A1* | 10/2011 | Bender et al. | 707/769 |
| 2011/0276744 A1* | 11/2011 | Sengupta et al. | 711/103 |
| 2012/0011144 A1* | 1/2012 | Transier et al. | 707/769 |

OTHER PUBLICATIONS

Maged M. Michael, "High Performance Dynamic Lock-Free Hash Tables and List-Based Sets", The 14th Annual ACM Symposium on Parallel Algorithms and Architectures, pp. 73-82 (10 pages), Aug. 2002.*

Luo et al., "Mining Double Association Rules on Temporal Dataset", IEEE, in The 3rd International Conference on Pervasive Computing and Applications (ICPCA 2008), 2008, pp. 543-546 (4 pages).*

Sundell, Hakan and Tsigas, Philippas "Lock-Free Deques and Doubly Linked Lists," J. Parallell Distrib. Comput. 68 (2008) 1008-1020, www.elsevier.com/locate/jpdc.

* cited by examiner

CONCURRENT LINKED HASHED MAPS

TECHNICAL FIELD

Embodiments of the present invention relate to computing systems, and more particularly, to networked memory.

BACKGROUND

Data grid offer ease of accessibility to data by exposing a simple data structure—a cache—in which objects can be stored. In a distributed mode where caches cluster together, a large memory heap can be exposed. This is more powerful than simple replication in that it distributes a fixed number of replicas of each entry—providing resilience to server failure—as well as scalability since the work done to store each entry is fixed in relation to cluster size.

Because the data structure is shared, each cache node needs to be synchronized with other cache nodes. Prior solutions involve locking up the system (e.g. preventing any changes) while data is being synchronized.

BRIEF DESCRIPTION OF THE DRAWINGS

The present invention is illustrated by way of example, and not by way of limitation, in the figures of the accompanying drawings and in which.

DETAILED DESCRIPTION

An apparatus and a method for forming a concurrent linked hash map is described herein. Doubly linked nodes of a linked list are formed in a data container of a networked memory. A hash table is generated from the doubly linked nodes. A parent node is located in the hash table to update a reference of a node in the data container. The parent node is processed in a forward direction of the linked list.

A linked list is a data structure that consists of a sequence of data records such that in each record there is a field that contains a reference (i.e., a link) to the next record in the sequence. Linked lists are among the simplest and most common data structures, and are used to implement many abstract data structures, such as stacks, queues, hash tables, symbolic expressions, skip lists, among others. Each record of a linked list can be referred to as an element or a node. The field of each node that contains the address of the next node may be referred to as the next link or the next pointer. The remaining fields are known as the data, information, value, or payload fields. The head of a list is its first node, and the tail is the list minus that node (or a pointer thereto).

Figure 1:
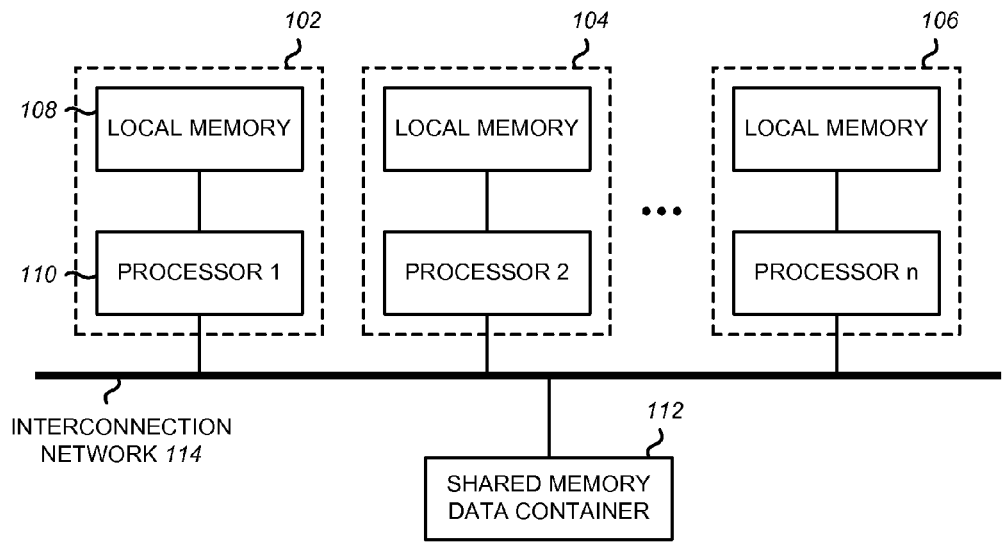
FIG. 1 is a block diagram illustrating one embodiment of a shared memory system.

FIG. 1 is a block diagram illustrating one embodiment of a shared memory system. Each node 102, 104, 106 of the system include their own local memory 108, and processing device 110. The nodes are connected to a shared memory data container 112 via an interconnection network 114. Thus, data from data container 112 is shared among nodes 102, 104, and 106. However, the data may not be uniformly accessible by all nodes because processing devices of each node can have different access times on different parts of the memory. A technique known as compare-and-swap (CAS) is used in the data structure of data container 112 to enable data synchronization across the nodes. The technique is further discussed below with respect to FIGS. 3 and 4.

Figure 2:
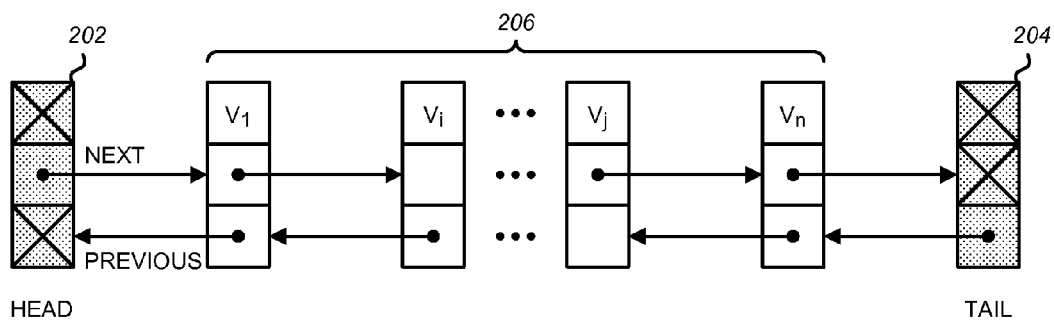
FIG. 2 is a block diagram illustrating one embodiment of a doubly linked data structure.

FIG. 2 is a block diagram illustrating one embodiment of a doubly linked data structure in a data container. The field of each node that contains the address of the next node is usually called the next link or next pointer. The remaining fields are known as the data, information, value, or payload fields. In the doubly-linked list, each node contains, besides the next-node link, a second link field pointing to the previous node in the sequence. The two links may be called forward(s) and backwards. The head 202 of a list is its first node, and the tail 204 is the list minus that node (or a pointer thereto). Head node 202 is linked via other nodes 206 to tail node 204.

Figure 3:
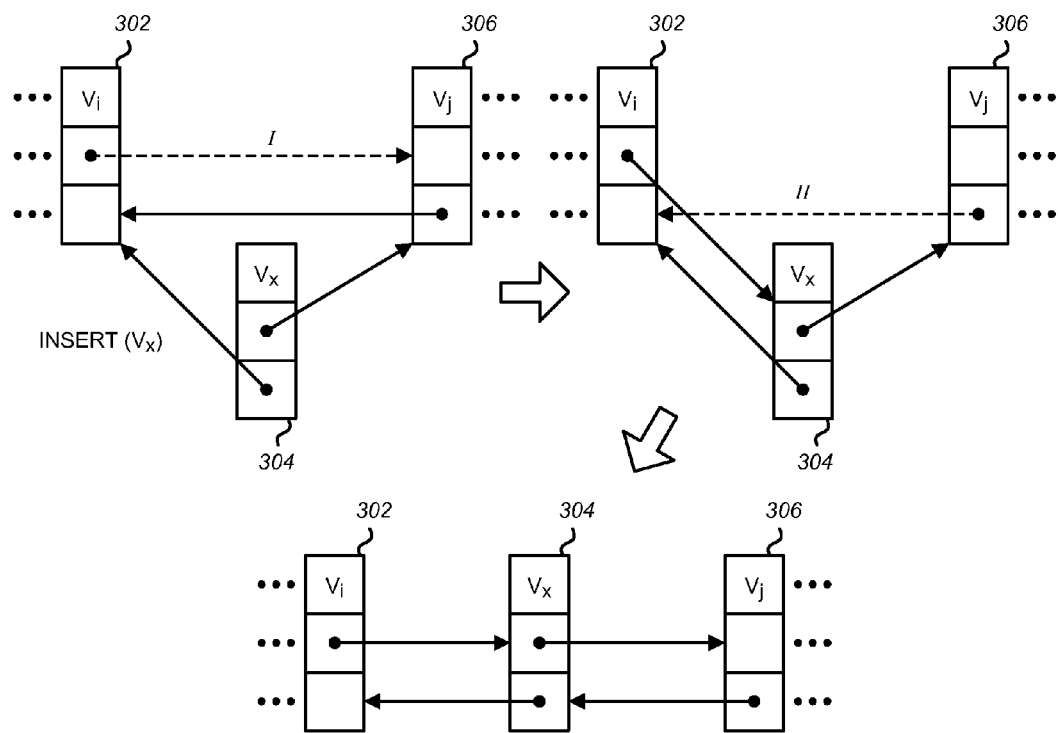
FIG. 3 is a block diagram illustrating one embodiment of an insertion of a node in a doubly linked list.

FIG. 3 illustrates one embodiment of an insertion of a node in a doubly linked list. The main algorithm steps for inserting a new node at an arbitrary position in the doubly linked list is as follows: (I) after setting the new node's 304 "previous" and "next" pointers, atomically update the "next" pointer of the to-be-previous node 302, (II) atomically update the previous pointer of the to-be-next node 306.

Figure 4:
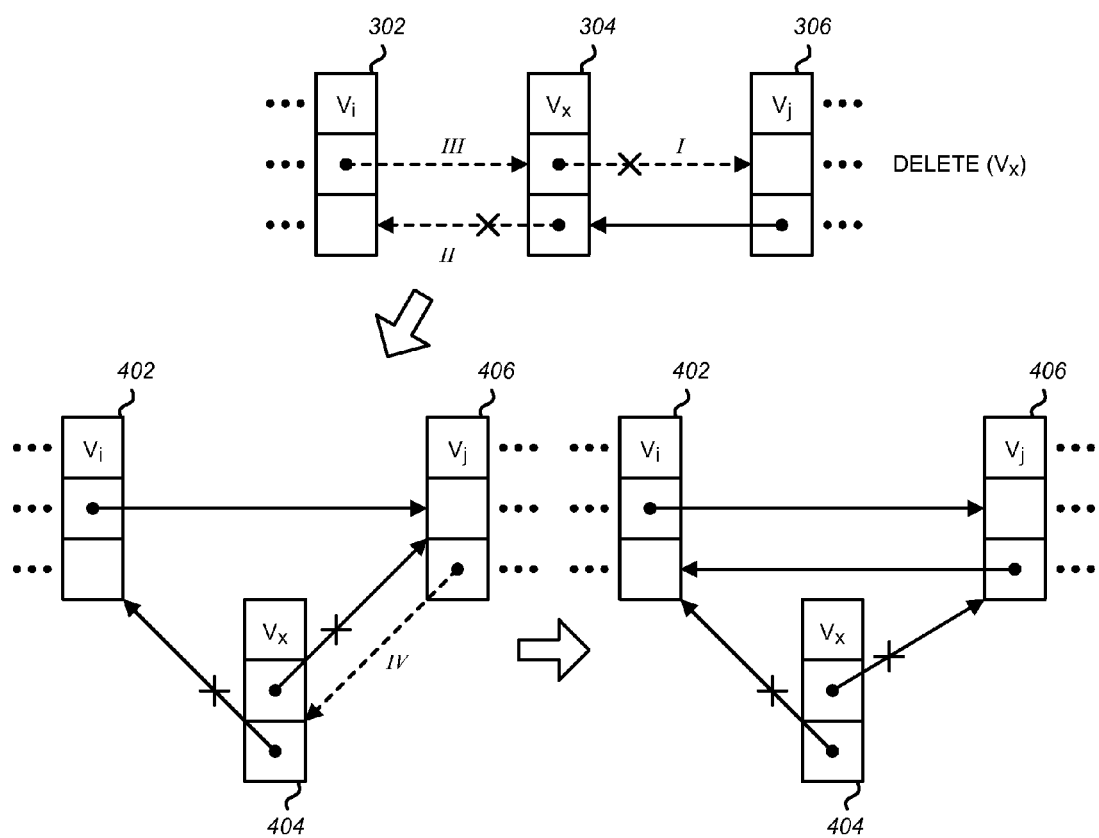
FIG. 4 is a block diagram illustrating one embodiment of a deletion of a node in a doubly linked list.

FIG. 4 illustrates one embodiment of a deletion of a node 404 in a doubly linked list (between nodes 402 and 406). The main steps of the algorithm for deleting a node at an arbitrary position are the following: (I) set the deletion mark on the "next" pointer of the to-be-deleted node 404, (II) set the deletion mark on the "previous" pointer of the to-be-deleted node 404, (III) atomically update the next pointer of the "previous" node of the to-be-deleted node 404, (IV) atomically update the "previous" pointer of the next node of the to-be-deleted node 404. The above addition and deletion technique is implemented in to a linked hash map using ConcurrentHashMap class and ConcurrentSkipListMap class as discussed further below.

To achieve efficient ordering of entries/nodes in a Data-Container interface for configurations that support eviction of cache nodes in a cluster of cache nodes, there is a need for a linked HashMap implementation that is thread-safe and performant.

Compare-and-swap (CAS) is a technique for atomically updating a variable or a reference without the use of a mutual exclusion mechanism like a lock. But this only works when a single memory location is modified at a time, be it a reference or a primitive. Sometimes one needs to atomically update two separate bits of information in a single go, such as a reference, as well as some information about that reference (reference marking). In C, this is sometimes done by making use of the assumption that an entire word in memory is not needed to store a pointer to another memory location, and some bits of this word can be used to store additional flags via bitmasking. This allows for atomic updates of both the reference and this extra information using a single CAS operation.

This is possible in Java too using AtomicMarkableReference, but this is usually considered overly complex, slow and space-inefficient. Instead, in accordance with one embodiment, a technique from ConcurrentSkipListMap is used for an intermediate, delegating entry. ConcurrentSkipListMap is a scalable concurrent ConcurrentNavigableMap implementation. The map is sorted according to the natural ordering of its keys, or by a Comparator provided at map creation time, depending on which constructor is used. This class implements a concurrent variant of SkipLists providing expected average log(n) time cost for the containsKey, get, put and remove operations and their variants. Insertion, removal, update, and access operations safely execute concurrently by multiple threads. Iterators are weakly consistent, returning elements reflecting the state of the map at some point at or since the creation of the iterator. They do not throw ConcurrentModificationException, and may proceed concurrently with other operations. Ascending key ordered views and their iterators are faster than descending ones.

While ConcurrentSkipListMap adds a little more complexity in traversal, it performs better than an AtomicMarkableReference.

In this specific example of implementation, the 'extra information' stored in a reference is the fact that the entry holding the reference is in the process of being deleted. It is a common problem with lock-free linked lists with concurrent insert and delete operations that the newly inserted entry gets deleted as well, since it attaches itself to the entry being concurrently deleted. When the entry to be removed marks its references, however, this makes other threads aware of the fact and cause CAS operations on the reference to fail and retry.

Figure 5:
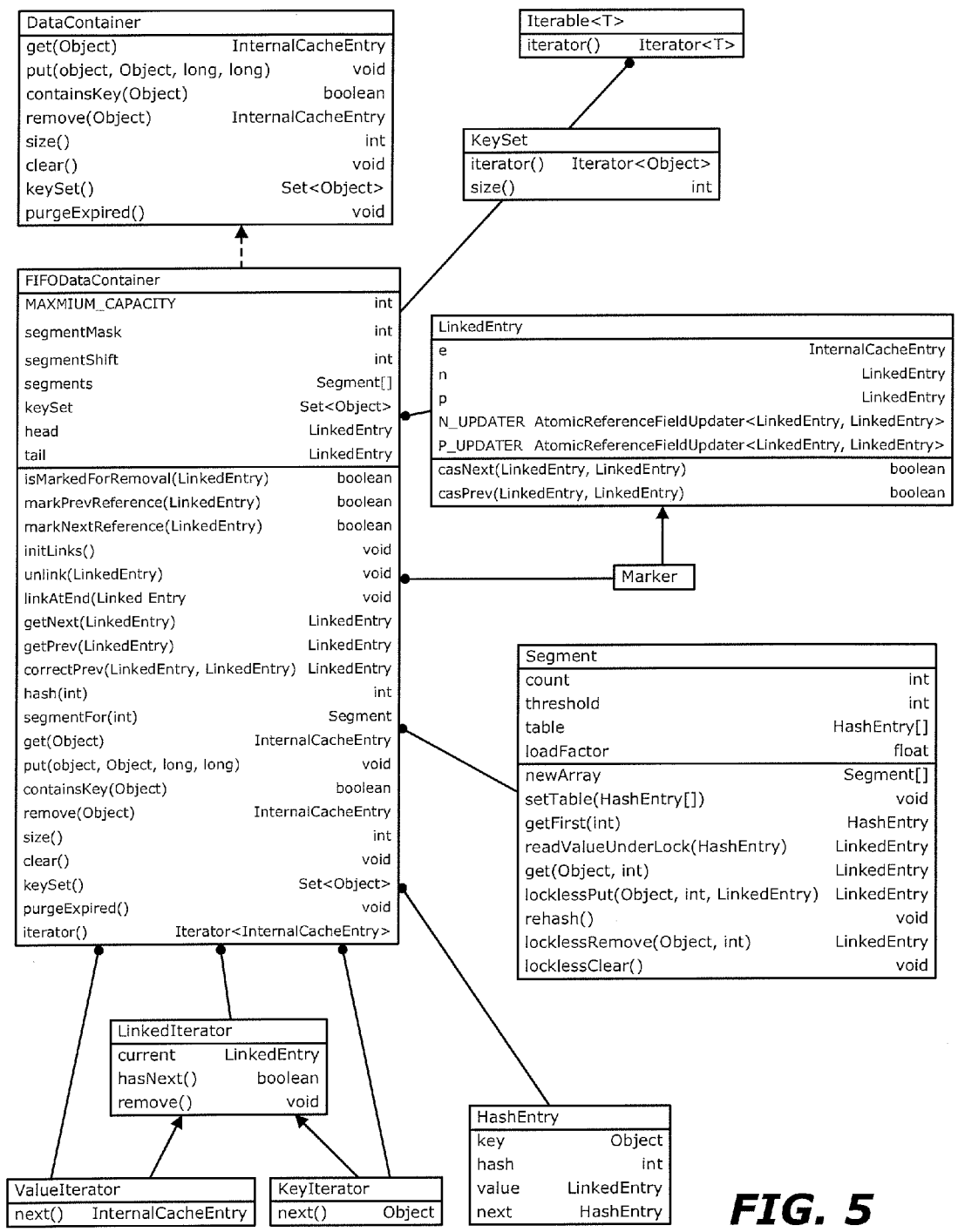
FIG. 5 is a block diagram illustrating one embodiment of a programming class for a concurrent linked hash maps.

One goal of one embodiment is to achieve constant-time performance for all operations on the Data Container. FIG. 5 is a block diagram illustrating one embodiment of a programming class for a concurrent linked hash maps. In particular, it depicts a FIFODataContainer (First In First Out Data Container) class. At its heart the FIFODataContainer mimics a ConcurrentHashMap (CHM), making use of hashtable-like lockable segments. Unlike the segments in CHM, however, these segments are simpler as they support a much smaller set of operations.

CHM is a hash table supporting full concurrency of retrievals and adjustable expected concurrency for updates. This class obeys the same functional specification as Hashtable, and comprises versions of methods corresponding to each method of Hashtable. However, even though all operations are thread-safe, retrieval operations do not entail locking, and there is not any support for locking the entire table in a way that prevents all access. This class is fully interoperable with Hashtable in programs that rely on its thread safety but not on its synchronization details. Retrieval operations (including get) generally do not block but may overlap with update operations (including put and remove). Retrievals reflect the results of the most recently completed update operations holding upon their onset. For aggregate operations such as putAll and clear, concurrent retrievals may reflect insertion or removal of only some entries. Similarly, Iterators and Enumerations return elements reflecting the state of the hash table at some point at or since the creation of the iterator/enumeration. They do not throw ConcurrentModificationException. However, iterators are designed to be used by only one thread at a time.

The allowed concurrency among update operations is guided by the optional concurrencyLevel constructor argument (default 16), which is used as a hint for internal sizing. The table is internally partitioned to try to permit the indicated number of concurrent updates without contention. Because placement in hash tables is essentially random, the actual concurrency will vary. Ideally, a value is chosen to accommodate as many threads as will ever concurrently modify the table. Using a significantly higher value than one needs can waste space and time, and a significantly lower value can lead to thread contention. But overestimates and underestimates within an order of magnitude do not usually have much noticeable impact. A value of one is appropriate when it is known that only one thread will modify and all others will only read. Also, resizing this or any other kind of hash table is a relatively slow operation, so, when possible, it is a good idea to provide estimates of expected table sizes in constructors.

Retrieving Data from the Container:

The use of segments allow for constant-time thread-safe get( ) and containsKey( ) operations. Iterators obtained from the DataContainer—which implements Iterable, and hence usable in for-each loops—and keySet( ) are immutable, thread-safe and efficient, using traversal of the linked list—making use of getNext( ) and getPrev( ) helpers. Traversal is efficient and constant-time.

Updating the Container:

When removing an entry, remove( ) locks the segment in question, removes the entry, and unlinks the entry. Both operations are thread-safe and constant-time. Locking the segment and removing the entry is straightforward. Unlinking involves marking references, and then an attempt at CAS'ing next and previous references to bypass the removed entry. The order here is important: the next reference update needs to happen first, read on for more details as to why.

When performing a put( ), the entry is created, segment locked and entry inserted into the segment. The entry is then inserted at the tail of the linked list. Again, both operations are thread-safe and constant-time. Linking at the tail involves careful CAS'ing of references on the new entry, the tail dummy entry and the former last entry in the list.

Maintaining a Lock-Free, Concurrent Doubly Linked List:

The entries in this implementation are doubly linked. Unlike the ConcurrentSkipListMap, a hashtable is used to look up entries to be removed, to achieve constant time performance in lookup. Locating the parent entry to update a reference needs to be constant-time as well, and hence the need for a previous reference.

It should be noted that reverse-order traversal is not supported. This means that the focus is about maintaining accuracy in the forward direction of the linked list, and treating the previous reference as an approximation to an entry somewhere behind the current entry.

Previous references can then be corrected—using the correctPrev( ) helper method described below—to locate the precise entry behind the current entry. By placing greater importance on the forward direction of the list, this allows to reliably CAS the forward reference even if the previous reference CAS fails.

Hence whenever any references are updated, the next reference is CAS'd first, and only on this success the previous reference CAS is attempted. The same order applies with marking references. Also, any process that touches an entry that observes that the next pointer is marked but the previous pointer is not. There is an attempt to mark the previous pointer before attempting any further steps.

In one embodiment, the specific functions to support DataContainer operations, are:

void linkAtEnd(LinkedEntry entry);
void unlink(LinkedEntry entry);
LinkedEntry correctPrev(LinkedEntry suggestedPrev, LinkedEntry current);
LinkedEntry getNext(LinkedEntry current);
LinkedEntry getPrev(LinkedEntry current).

These are exposed as protected final methods, usable by FIFODataContainer and its subclasses. The implementations themselves use a combination of CAS's on a LinkedEntry's next and previous pointers, marking references, and helper correction of previous pointers when using getNext( ) and getPrevious( ) to traverse the list.

In one embodiment, only the last two methods are used when traversing rather than directly accessing a LinkedEntry's references—since markers need to be stepped over and links corrected.

Figure 6:
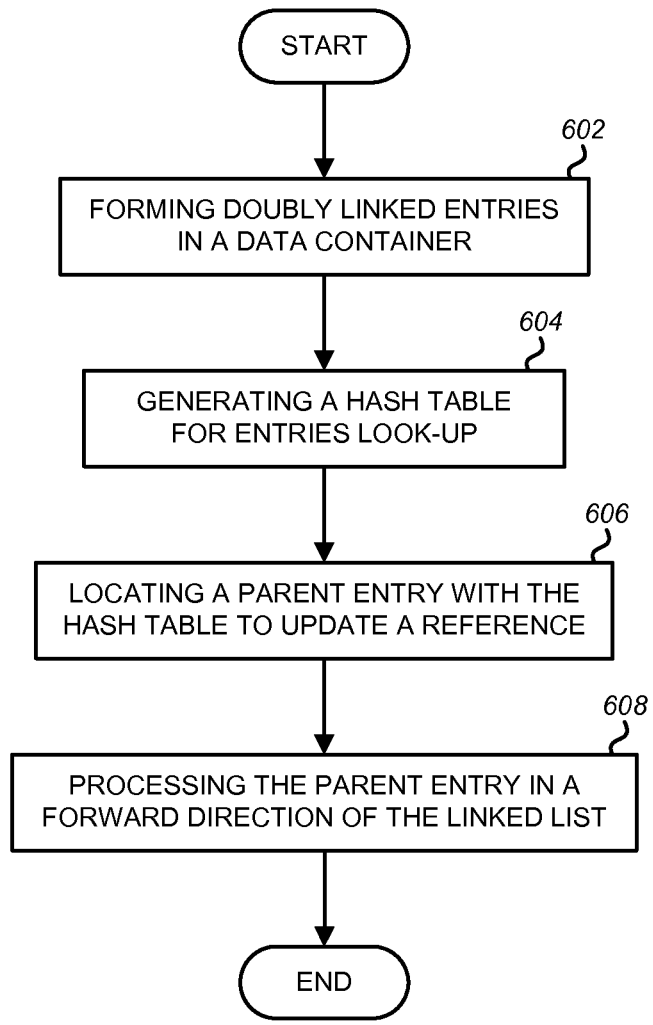
FIG. 6 is a flow diagram illustrating one embodiment of a method for forming a concurrent linked hash map.

FIG. 6 is a flow diagram illustrating one embodiment of a method for forming a concurrent linked hash table. At 602, doubly linked entries (also referred to as nodes) are formed in a linked list of a data container. At 604, a hash table is generated for the doubly linked entries for look-up. At 606, a parent entry is located in the linked list of the hash table to update a reference. At 608, the parent entry is processed in a forward direction of the linked list. Each doubly linked node comprises a next node reference (or link) and a previous node reference (or link).

Figure 7:
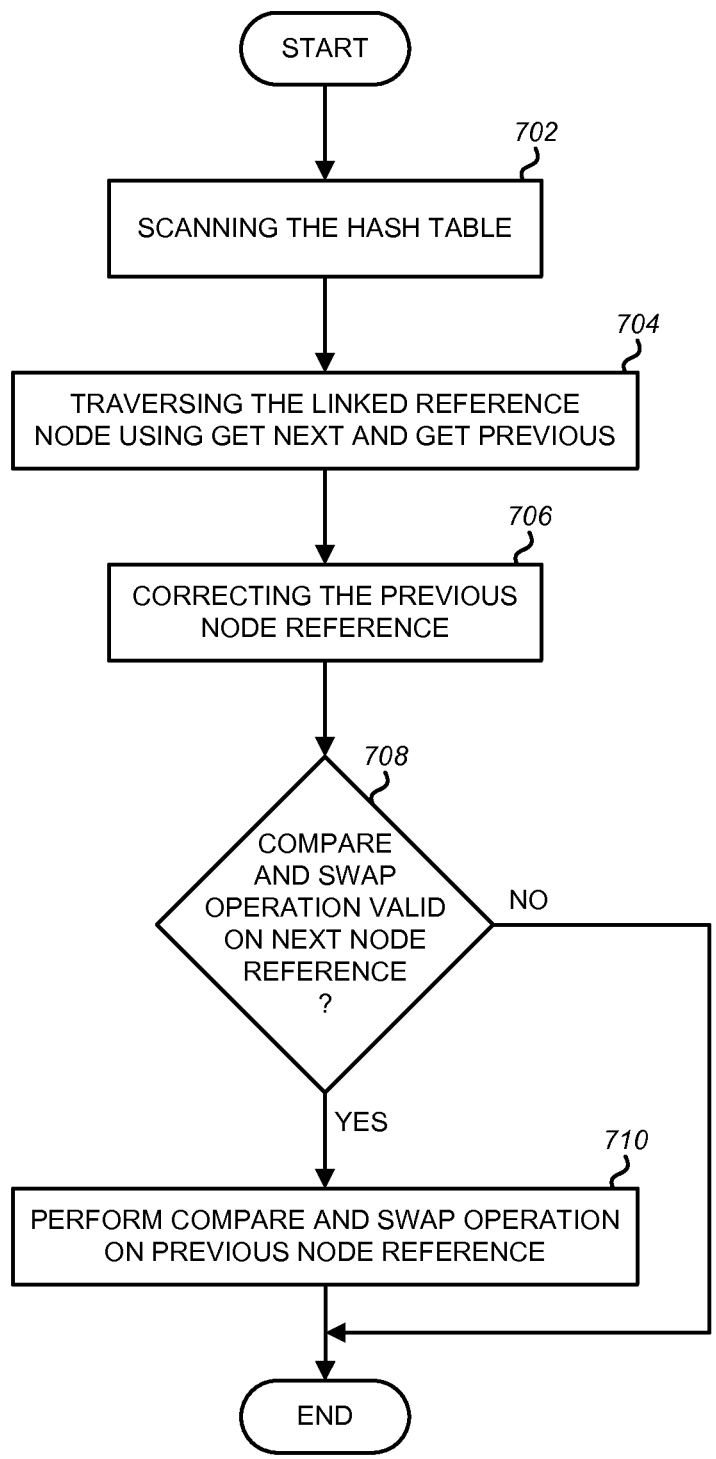
FIG. 7 is a flow diagram illustrating one embodiment of a method for processing the concurrent linked hash map.

FIG. 7 is a flow diagram illustrating another embodiment for processing a hash table. At 702, the hash table generated at 604 is scanned to determine whether a node needs to be updated, and to achieve a constant time performance while searching the hash table.

At 704, the linked reference node of the node is traversed using a get next operator and a get previous operator. At 706, the previous node reference is corrected using a correction operator to locate a node behind a current node. At 708, a compare and swap (CAS) operation may be performed on a next node reference. Upon successful operation on the next node reference, a CAS operation is performed on a previous node reference at 710.

Figure 8:
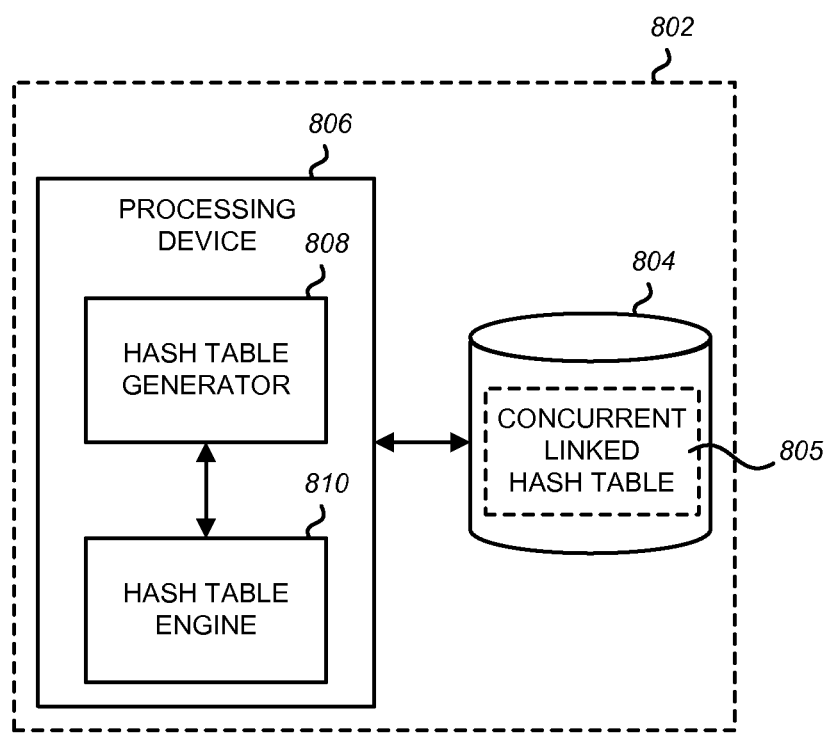
FIG. 8 is a block diagram illustrating an example of a computer system for implementing the concurrent linked hash maps.

FIG. 8 is a block diagram illustrating an example of a computer system 802 for implementing the concurrent linked hash maps. In one embodiment, computer system 802 comprises a storage device 804 and a processing device 806.

Processing device 806 comprises a hash table generator 808 and a hash table engine 810. Hash table generator 808 is configured to form doubly linked nodes of a linked list in a data container and to generate a hash table 805 from the doubly linked nodes. Hash table 805 may stored in storage device 804.

Hash table engine 810 is configured to locate a parent node in the hash table to update a reference of a node in the data container and to process the parent node in a forward direction of the linked list. Hash table generator 808 and hash table engine 810 respectively operate according to the method described above with respect to FIGS. 6 and 7.

Processing device 806 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 806 may also be one or more special-purpose processing devices such as an application specific integrated circuit (ASIC), a field programmable gate array (FPGA), a digital signal processor (DSP), network processor, or the like.

In one embodiment, storage device 804 is configured to store concurrent linked hashed tables/maps 805 generated by hash table generator 808. In one embodiment, the concurrent linked hash tables 805 are stored in a computer-accessible storage medium of storage device 804. While the computer-accessible storage medium is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   forming doubly linked nodes of a linked list in a data container of a networked memory;
   generating a hash table from the doubly linked nodes at a hash table generator of a computer system;
   estimating a size of the hash table;
   determining a value associated with a number of concurrent threads to modify the hash table;
   partitioning the hash table in view of the determined value;
   locating, by a processing device, a parent node in the partitioned hash table, the parent node to update a reference of a referenced node in the data container at a hash table engine of the computer system; and
   processing the parent node in a forward direction of the linked list with the hash table engine in view of the estimated size of the hash table.

2. The method of claim 1 wherein each doubly linked node comprises a next node reference and a previous node reference.

3. The method of claim 1 further comprising:
   scanning the hash table to determine a node to be updated and to achieve a constant time performance while searching the hash table.

4. The method of claim 2 further comprising:
   traversing the reference of the referenced node in the data container using a get next operator and a get previous operator.

5. The method of claim 2 further comprising:
   correcting the previous node reference using a correction operator to locate a node behind a current node.

6. The method of claim 2 further comprising:
   performing a compare and swap (CAS) operation on a next node reference; and
   upon successful operation on the next node reference, performing a CAS operation on a previous node reference.

7. The method of claim 1 wherein the doubly linked nodes are stored in a plurality of storage devices of a plurality of servers to form a data grid.

8. A non-transitory computer-readable storage medium, having instructions stored therein, which when executed, cause a processing device to execute operations comprising:
   forming doubly linked nodes of a linked list in a data container of a networked memory;
   generating a hash table from the doubly linked nodes at a hash table generator of a computer system;
   estimating a size of the hash table;
   determining a value associated with a number of concurrent threads to modify the hash table;
   partitioning the hash table in view of the determined value;
   locating, by the processing device, a parent node in the partitioned hash table to update a reference of a referenced node in the data container at a hash table engine of the computer system; and
   processing the parent node in a forward direction of the linked list with the hash table engine in view of the estimated size of the hash table.

9. The non-transitory computer-readable storage medium of claim 8 wherein each doubly linked node comprises a next node reference and a previous node reference.

10. The non-transitory computer-readable storage medium of claim 8 wherein the operations further comprises:
    scanning the hash table to determine a node to be updated, and to achieve a constant time performance while searching the hash table.

11. The non-transitory computer-readable storage medium of claim 9 further comprising:
    traversing the reference of the referenced node in the data container using a get next operator and a get previous operator.

12. The non-transitory computer-readable storage medium of claim 9 further comprising:
    correcting the previous node reference using a correction operator to locate a node behind a current node.

13. The non-transitory computer-readable storage medium of claim 9 further comprising:
    performing a compare and swap (CAS) operation on a next node reference; and
    upon successful operation on the next node reference, performing a CAS operation on a previous node reference.

14. The non-transitory computer-readable storage medium of claim 8 wherein the doubly linked nodes are stored in a plurality of storage devices of a plurality of servers to form a data grid.

15. A system comprising:
    a storage device to store a data container;
    a processing device coupled to the storage device;
    a hash table generator executed by the processing device, the hash table generator to:
       form doubly linked nodes of a linked list in the data container;
       generate a hash table from the doubly linked nodes;
       estimate a size of the hash table;
       determine a value associated with a number of concurrent threads to modify the hash table; and
       partition the hash table in view of the determined value; and
    a hash table engine executed by the processing device and communicably coupled to the hash table generator, the hash table engine to:
       locate a parent node in the partitioned hash table to update a reference of a referenced node in the data container; and
       process the parent node in a forward direction of the linked list in view of the estimated size of the hash table.

16. The system of claim 15 wherein each doubly linked node comprises a next node reference and a previous node reference.

17. The system of claim 15, the hash table engine to scan the hash table to determine a node to be updated, and to achieve a constant time performance while searching the hash table.

18. The system of claim 16, the hash table engine to traverse the reference of the referenced node in the data container using a get next operator and a get previous operator.

19. The system of claim 16, the hash table engine to correct the previous node reference using a correction operator to locate a node behind a current node.

20. The system of claim 16, the hash table engine to perform a compare and swap (CAS) operation on a next node reference, and upon successful operation on the next node reference, to perform a CAS operation on a previous node reference.

* * * * *